(12) United States Patent
Francis et al.

(10) Patent No.: US 9,542,568 B2
(45) Date of Patent: Jan. 10, 2017

(54) SYSTEMS AND METHODS FOR ENFORCING THIRD PARTY OVERSIGHT OF DATA ANONYMIZATION

(71) Applicant: MAX PLANCK GESELLSCHAFT ZUR FOERDERUNG DER WISSENSCHAFTEN, Munich (DE)

(72) Inventors: Paul Francis, Kaiserlautern (DE); Felix Bauer, Kaiserlautern (DE); Sebastian Probst Eide, Kaiserlautern (DE); Matthias Kretschmer, Sankt Augustin (DE); Cristian Daniel Berneanu, Bucharest (RO)

(73) Assignee: MAX PLANCK GESELLSCHAFT ZUR FOERDERUNG DER WISSENSCHAFTEN E.V., Munich (DE)

( * ) Notice: Subject to any disclaimer, the term of this patent is extended or adjusted under 35 U.S.C. 154(b) by 0 days.

(21) Appl. No.: 14/283,383

(22) Filed: May 21, 2014

(65) Prior Publication Data
US 2015/0089219 A1 Mar. 26, 2015

Related U.S. Application Data

(60) Provisional application No. 61/882,321, filed on Sep. 25, 2013.

(51) Int. Cl.
*G06F 21/62* (2013.01)
*G06F 21/51* (2013.01)
(Continued)

(52) U.S. Cl.
CPC ........... *G06F 21/6218* (2013.01); *G06F 21/51* (2013.01); *G06F 21/575* (2013.01); *H04L 9/3234* (2013.01); *H04L 9/3263* (2013.01); *G06F 21/62* (2013.01)

(58) Field of Classification Search
CPC ...... G06F 21/62; G06F 21/6218; G06F 21/51; G06F 21/575; H04L 9/3234; H04L 9/3263
(Continued)

(56) References Cited

U.S. PATENT DOCUMENTS

| 2003/0097579 A1* | 5/2003 | England | G06F 21/53 713/193 |
| 2004/0139334 A1* | 7/2004 | Wiseman | G06F 21/51 713/188 |

(Continued)

FOREIGN PATENT DOCUMENTS

| WO | 2009015116 A1 | 1/2009 |
| WO | 2012064176 A1 | 5/2012 |

*Primary Examiner* — Ellen Tran
*Assistant Examiner* — Samuel Ambaye
(74) *Attorney, Agent, or Firm* — Grogan, Tuccillo & Vanderleeden, LLP (57) ABSTRACT

A modifiable server is utilized to reliably seal and unseal data according to a measurement of the server, by structuring the server to have a modifiable sandbox component for sealing, unsealing the data, and a non-modifiable checker component for enabling or disabling said sandbox component. The checker component determines whether the sandbox component complies with pre-determined standards. If the sandbox component is compliant, the checker component enables the sandbox component to seal and unseal the data using a measurement of the checker component. Otherwise, the checker component disables the sandbox component.

25 Claims, 7 Drawing Sheets

(51) Int. Cl.
*H04L 9/32* (2006.01)
*G06F 21/57* (2013.01)

(58) Field of Classification Search
USPC ............... 713/165, 169; 709/203, 225, 226; 705/50–79
See application file for complete search history.

(56) References Cited

U.S. PATENT DOCUMENTS

2007/0179904 A1    8/2007   Hofstee et al.
2010/0082960 A1*   4/2010   Grobman .............. G06F 21/575
                                                       713/2

* cited by examiner

SYSTEMS AND METHODS FOR ENFORCING THIRD PARTY OVERSIGHT OF DATA ANONYMIZATION

CROSS-REFERENCE TO RELATED APPLICATIONS

This application claims the benefit of U.S. Provisional Application Ser. No. 61/882,321, filed on Sep. 25, 2013, and hereby incorporated by reference in its entirety.

FIELD OF THE INVENTION

The present invention relates generally to a method and system for giving trusted third parties oversight of servers that handle private user data.

BACKGROUND OF THE INVENTION

There are many cases where users submit private data to remote servers. The organization operating the servers (the serving organization) may claim to protect the user's data in one way or another (for instance in a privacy statement). The users may not fully trust the organization operating the servers (the serving organization), and may wish to have some strong assurance from a trusted third party that the serving organization will honor its claim of protection. Today this is done in a weak fashion. For instance, the third party may examine the server software and provide a certification that the software faithfully executes the protection claim. However, the serving organization may easily modify its software afterwards and remove the claimed protections. There is a need for systems and methods that enforce trusted third party control over server software, so that the serving organization must be incapable of modifying its software without approval from the third party. Furthermore, users must have strong assurance that this enforced control exists before transmitting private data to the server.

SUMMARY OF THE INVENTION

In accordance with one aspect of the present invention, independent third parties are able to prevent operation of specific server application software unless some or all of the third parties approve that software. Users submitting private data to the servers can obtain cryptographic proof that the independent third parties have this oversight. In addition, a server is able to produce a tamper-proof log of all software versions that have run previously. This allows anyone to know exactly what software has run in a server in the past. This model provides assurance to clients before sending data to a server that the server application software treats the data safely.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION OF PREFERRED EMBODIMENT

Reference will be made below in detail to exemplary embodiments of the invention, examples of which are illustrated in the accompanying drawings. Wherever possible, the same reference characters used throughout the drawings refer to the same or like parts.

Figure 1:
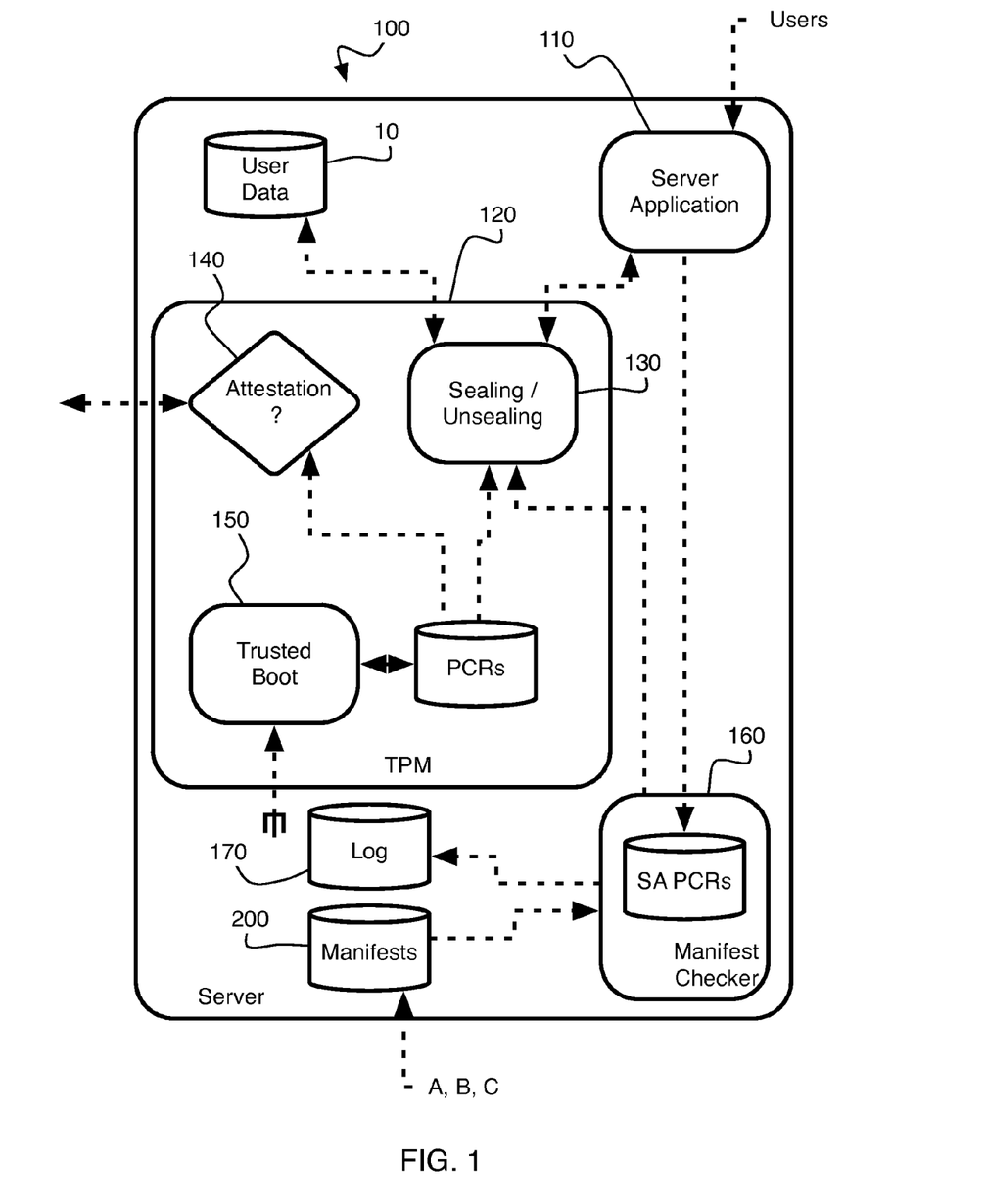
FIG. 1 shows in schematic view a server for handling protected user data.

As shown in FIG. 1, a server 100, which runs server application software 110 for handling private or protected user data 10, contains the functionality of a Trusted Platform Module (TPM) 120. This TPM functionality may be based on TPM hardware and associated motherboard firmware, or may be implemented within the server's CPU. The TPM may provide sealing and unsealing functionality 130 and remote attestation functionality 140, for instance as defined by the Trusted Computing Group. Also, the server 100 contains Trusted Boot functionality 150.

Essentially, the Trusted Boot 150 monitors at boot time some of the software resident on the server, and internally stores "measurements" of this software. The stored measurements are, for example, in the form of hashes of software executables and other files (i.e. software configuration files). These measurement hashes are stored within the TPM as Platform Configuration Registers (PCRs). The Trusted Boot establishes the PCRs that measure all of the components of the boot process, as well as optionally the PCRs of selected additional software. The Trusted Boot may be implemented for instance by TrustedGRUB. These PCRs provide proof that each component of the boot process, as well as the selected additional software, is indeed the software operating on the server.

Sealing and unsealing 130 refers to encryption and decryption of data according to the values of the PCRs in the TPM. In particular, when the TPM encrypts data as part of the sealing function, it records the values of specified PCRs. When the TPM is asked to decrypt the data (unseal), it will do so only if the previously specified PCRs have the same values. In effect, only the software that encrypted data can subsequently decrypt that data.

The TPM also can attest 140 to a remote device a cryptographic proof of its PCR measurement values. This proof derives from a certificate signed by the TPM manufacturer, which certifies a permanent key installed in the TPM by the manufacturer.

According to embodiments of the invention, the selected additional software measured by the Trusted Boot includes "manifest checker" software 160 (the "MC"). The set of PCRs established by Trusted Boot, including the PCRs of the MC, are called Sealing PCRs. This is because the sealing and unsealing of user data on the server is accomplished only when this set of PCRs is present.

According to certain embodiments, the MC 160 specifically measures the server application software (the "SA") 110, which is excluded from the Trusted Boot functionality in order to permit updates of the SA without rendering the server 100 inoperable. The SA includes all software components that are responsible for ensuring that user data is protected, and can include for instance the OS, configuration files, SELinux policies, and application binaries; but do not include measurements of the manifest checker 160. The PCR or PCRs that contain the current measurements of the SA are called the SA PCRs. The MC 160 compares the SA PCRs to stored measurements within one or more manifests 200, which are authenticated by trusted third parties as further discussed with reference to FIG. 2.

Figure 2:
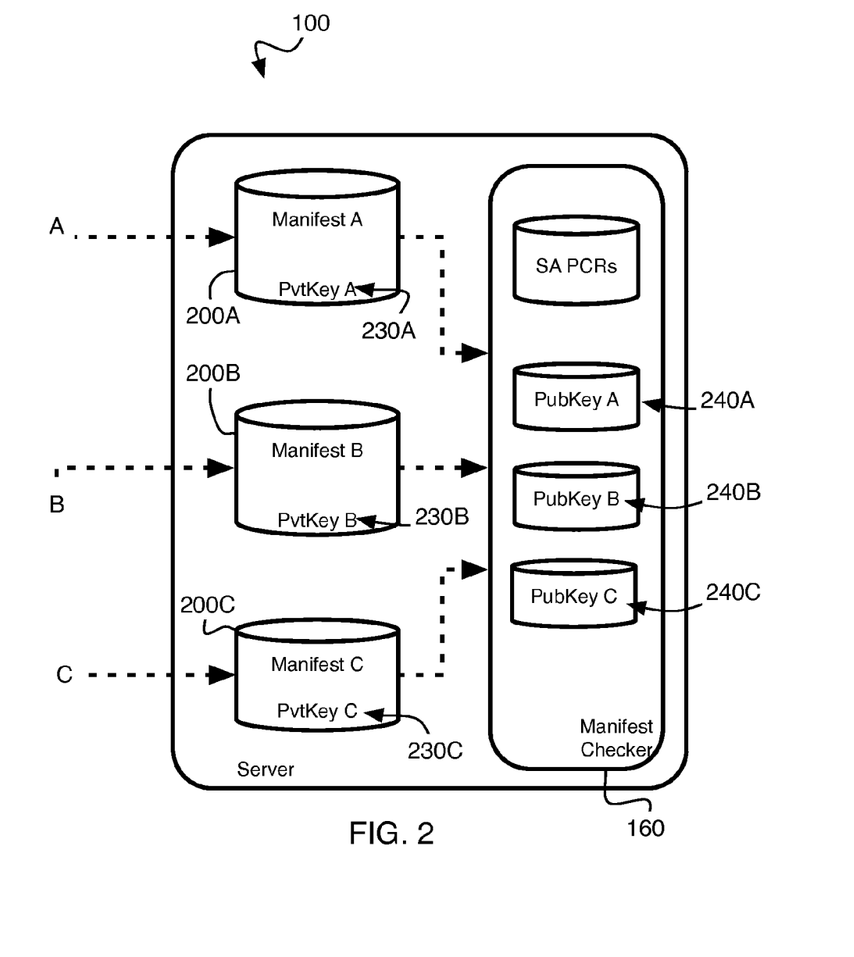
FIG. 2 shows in schematic view a method for third party approval of server software.

Referring to FIG. 2, the server 100 may store multiple manifests 200A, 200B, etc., which come from respective different third parties A, B, etc. Each third party authenticates its own manifest 200 (and the software measurements that compose the manifest). One method for authentication is for the third party to sign the manifest 200 using a signature 230 that can be verified by a certificate 240. For example, a third party may sign its respective manifest 200 by using a private key 230. A third party may also use its private key 230 to establish and authenticate a secure communications protocol such as SSL or IPSEC for submitting the manifest 200. The certificate 240 then would be the public key corresponding to the third party's private key 230. The certificates 240 are stored within the server 110 as part of the MC 160, and are included as part of the MC measurement.

Figure 3:
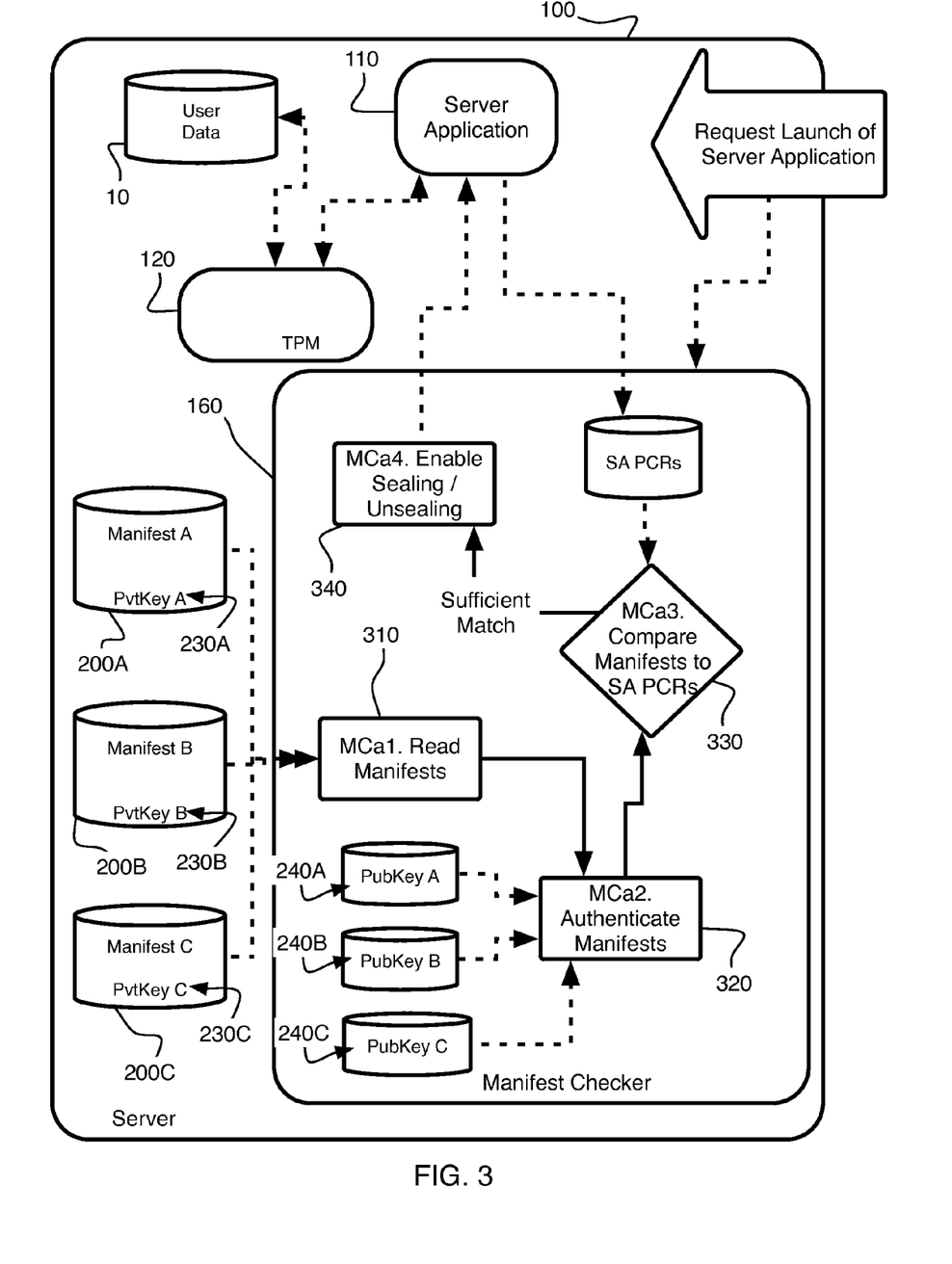
FIG. 3 shows in schematic view a method for verifying third party approval of server software.

Referring now to FIG. 3, the manifest checker 160 is a component of, and controls the operation of, the server 100. In response to each request to launch the server 100, the manifest checker 160 takes at least one measurement (SA PCR) of the server application 110, and takes the following steps:

MCa1. Read 310 the stored manifests 200.

MCa2. Authenticate 320 the manifests 200. Certificates 240 that are used to authenticate the manifests 200, were included in the manifest checker measurement used by the Trusted Boot 150 in FIG. 1. The manifest checker software 160 ignores any manifests 200 that are not authenticated.

MCa3. Compare 330 the authenticated manifests 200, against presently measured PCRs. This comparison 330 includes at least the SA PCRs.

MCa4. If a sufficient number of the manifests 200 match to the presently measured SA PCRs, then enable 340 the server application 110. Otherwise, do not enable the server application 110. For example, the manifest checker 160 may be configured such that all the manifests 200 must match; alternatively, as further discussed below, fewer than all the manifests may suffice.

As mentioned before with reference to FIG. 1, protected user data 10 is sealed 130 while stored in non-volatile memory on the server 100 (e.g., on a disk or flash memory). This may be done by directly sealing all of the user data, or more efficiently by sealing a key that encrypts and decrypts the user data. The key that encrypts and decrypts the user data then may be unsealed and used in system RAM. Either the MC 160 itself, or the SA 110, may perform sealing or unsealing 130 of protected user data 10, or may request sealing and unsealing 130 of data by the TPM 120. Alternatively, in the case where the TPM is embedded in the CPU, the key may be unsealed 130 within the CPU, and used for encryption and decryption while in the CPU. In this way, the key never leaves the CPU. In certain embodiments, instead of enabling the server application 110, the MC 160 may simply enable sealing/unsealing 130 of data (e.g., by the server application 110).

In certain embodiments, the data is sealed, according to only the sealing PCRs. This means that if the manifest checker 160 or any of the trusted boot components are modified, the TPM, MC, or SA cannot any longer unseal 130 the key for accessing (encrypting or decrypting) protected user data 10, even if the manifest checker 160 enables sealing/unsealing 130 or enables the server application 110.

For example, as shown in FIG. 2, third parties A and B hold private keys 230A, 230B that can be used to sign the manifests 200A, 200B that they respectively produce. These manifests 200 are transmitted and stored in the server 100. The manifest checker 160 contains certificates 240, for example the public keys for third parties A and B corresponding to their respective private keys 230. Each manifest 200 is authenticated Mca2 when its signature 230 is valid according to the corresponding stored certificate 240. The certificates 240 are included in the sealing PCR.

As an alternative method, instead of having a third party sign its manifest, the manifest checker 160 may authenticate the third parties A, B, etc. over a secure communications channel like SSL, using the certificates 240 that contain the public keys for the third parties. The certificates 240 are part of the measurement 220 of the manifest checker 160 that is used for sealing the protected user data 10.

As another alternative, instead of requiring that all third parties have a matching manifest (step MCa4), the manifest checker 160 could require that only some of the third parties have a matching manifest. For instance, if there were three third parties, the manifest checker might require that only two of them provide a matching manifest. As another alternative, the manifest checker 160 could require that some of the third parties have a matching manifest, and that at a later time, additional third parties have a matching manifest. In case the additional manifests were not supplied by the later time, the manifest checker would disable the server application software. For instance, if there are three third parties, the manifest checker may require that initially only one of them has a matching manifest, but that within one week a second matching manifest must be supplied. The minimum number of matching manifests, and/or the matching schedule, may be made a part of the manifest checker measurement, in which case, modifying the minimum number from what was previously approved, would make it impossible to unseal the user data 10.

In certain embodiments, a manifest 200 may negate the measurements of previous manifests. For instance, a manifest 200 may contain one or more measurements ("disabled measurements"), as well as an additional value or string indicating that software with this set of measurements must not be enabled. This is useful, for instance, if software with a previous measurement was found to have a security flaw, and so should never be run again.

Thus, referring to FIGS. 1-3, one use of the system and methods is as follows. The organization operating the server 100 makes a privacy policy, which describes how the server should protect user data 10. The privacy policy also states that user data 10 will never be handled by a system that does not protect data at least as well as stated in the privacy policy. Third parties A, B then inspect the server application 110 to insure that it enforces the privacy policy. These third parties each have a signing key 230 and corresponding certificate 240. They previously have submitted their certificates 240 to the server organization, which incorporates the certificates 240 into the manifest checking application 160. When the third parties are satisfied that the server software 100 follows the privacy policy, they produce and sign with their keys 230 respective manifests 200 that contain the measurements for the sealing PCRs and SA PCRs.

Figure 4:
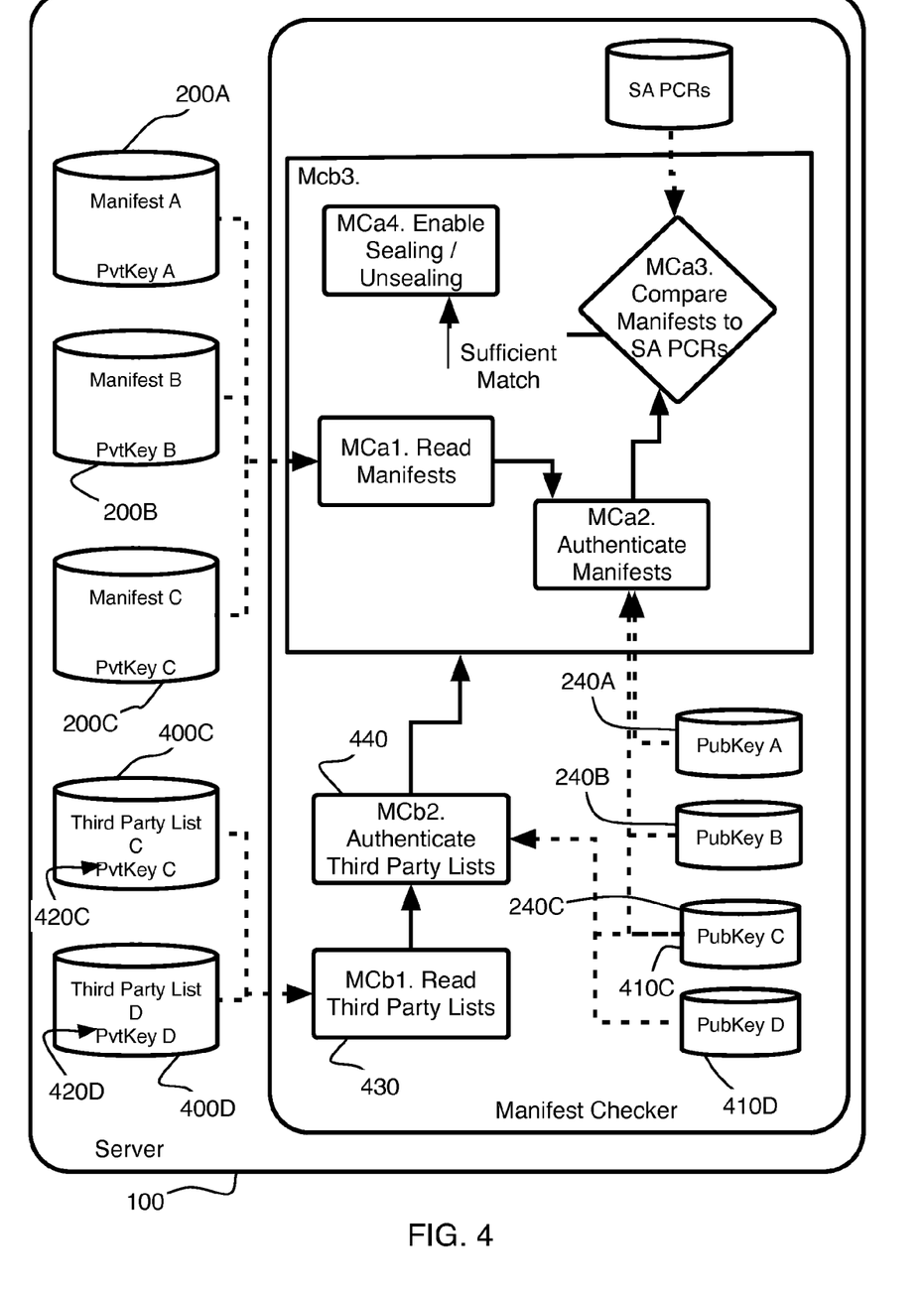
FIG. 4 shows in schematic view a method for managing lists of third parties trusted to approve server software.

In certain embodiments, of which FIG. 4 shows an example, it may be desirable to modify the list of third parties that are authorized generate manifests. In the embodiment of FIG. 3, adding or removing certificates 240 from the manifest checker 160 would result in the server application 110 not being able to unseal the user data 10. To avoid having to lose user data when the list of third party certificates changes, FIG. 4 provides for using an additional kind or layer of manifest, a third party list 400. The third party list 400 identifies certificates 240 of the authenticating third parties A, B, C that may produce a manifest. However, the certificates 240 contained in the third party list 400 are not part of the manifest checker measurement used by the TPM 120. Rather, the manifest checker measurement includes only the certificates 410 for the third parties that are allowed to produce third party lists 400.

Referring to FIG. 4, third parties C and D produce and sign third party lists 400C, 400D with their respective private keys 420C, 420D. The third party lists 400 contain the certificates (public keys) 240 for third parties A, B, C. The manifest checker 160 holds the certificates (public keys) 410 for third parties C and D, which are part of the sealing PCR measurement. The certificates 240 no longer are part of the sealing PCR measurement.

Thus, the manifest checker 160 takes the following steps:

MCb1. Read 430 the stored third party lists 400.

MCb2. Authenticate 440 the third party lists 400 against the certificates 410. Ignore any third party lists whose authentication fails.

MCb3. Using the certificates that correspond to the third parties A, B in the authenticated third party lists 400, execute steps MCa1 through MCa4.

The manifest checker 160 may refuse to execute step MCb3 if the third party lists 400 do not exactly match. Alternatively, the manifest checker may execute step MCb3 using only manifests authenticated by third parties that are common to all third party-lists 400. Alternatively, the manifest checker may use manifests authenticated by any of those third parties included in any of the third party lists. The manifest checker 160 may refuse to execute step MCb3 if there are not enough third parties listed in the third party lists. This minimum number of third parties may be part of the attested code base for sealing 130. Alternatively, the manifests may be authenticated during secure session establishment.

Figure 5:
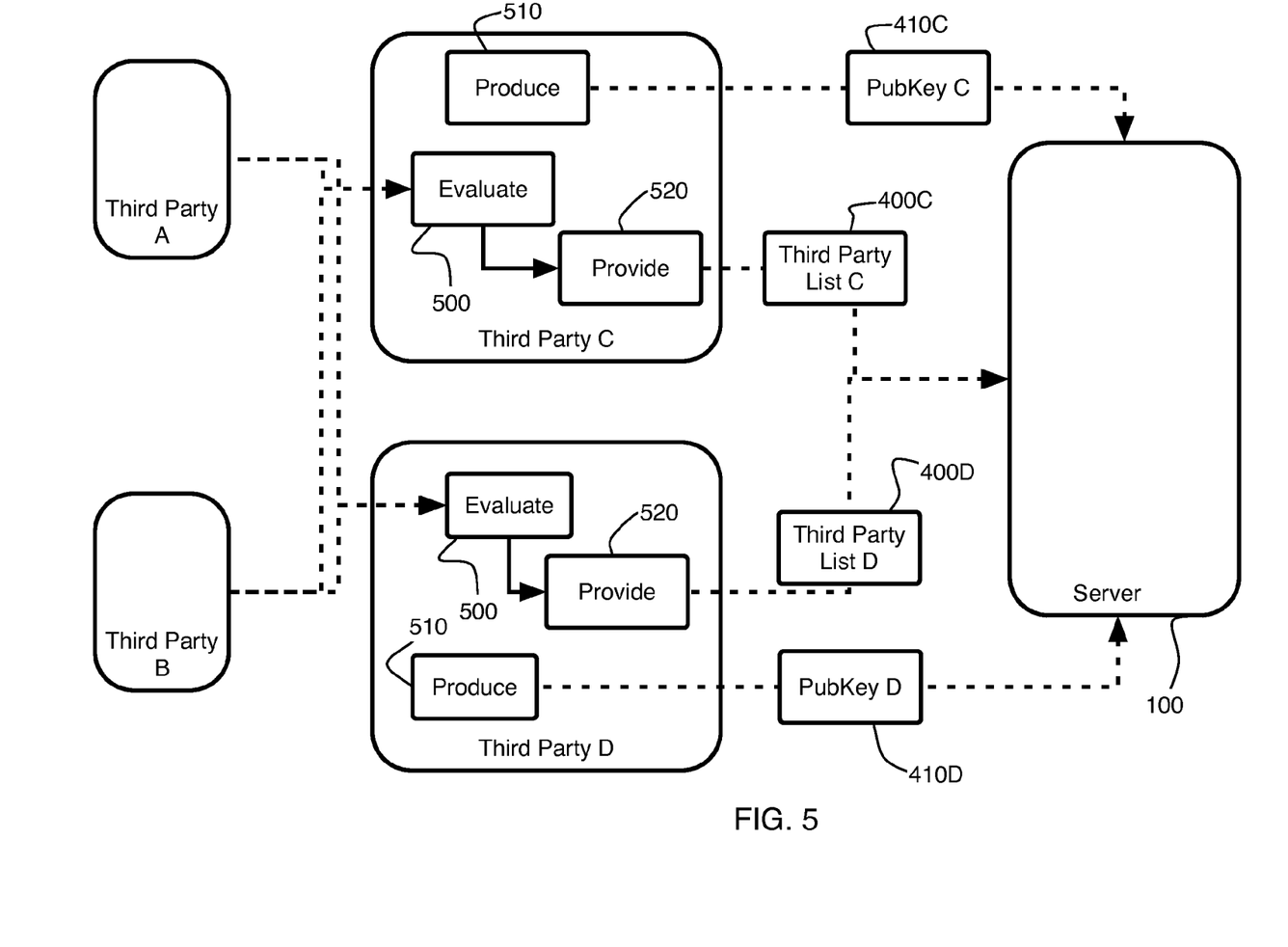
FIG. 5 shows in schematic view a method of accessing (providing or querying) protected user data via the server shown in FIG. 1.

Thus, referring to FIG. 5, evaluating third parties C, D can evaluate 500 whether the manifest-producing third parties A, B are qualified to inspect server software. These evaluating third parties C, D then each produce 510 a signing key 420 and corresponding certificate 410. They submit their certificates 410C, 410D to the server organization, which incorporates the certificates into the manifest checker 160. The evaluating third parties C, D then can qualify the manifest producing third parties A, B by providing respective third party lists 400C, 400D that include the certificates for the third parties A, B.

In certain embodiments, as shown for example in FIG. 1, the server 100 may store a tamper-proof log of all measurements for software operated by the server currently and in the past. For example, the manifest checker 160 may produce the log 170. One way to do this is for the server 100 or the manifest checker 160 to create an entry in the log 170, each time a PCR differs from its previous value. The log entry may contain the measurement PCR, along with a hash of the previous log entry (including the previous log entry's hash of the next previous log entry). The log may be requested and transmitted via a secure connection that is established as part of a remote attestation 250 (as shown in FIG. 2). Similarly, the server 100 (and more particularly, the manifest checker 160) also may produce a tamper-proof log of all manifests received by the server.

Figure 6:
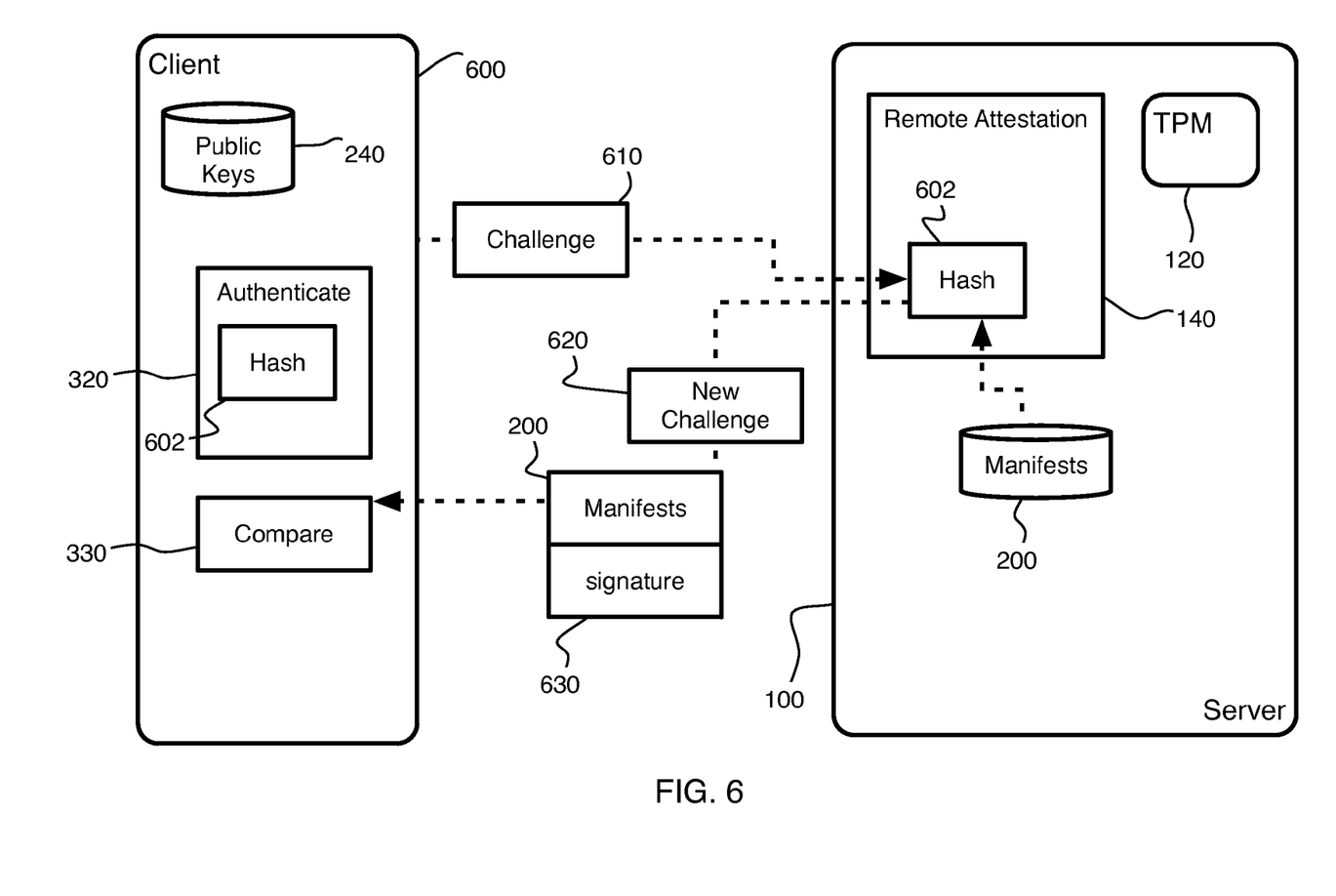
FIG. 6 shows in schematic view a mode of authenticating remote connection between a server and a client, according to one aspect of the invention.

Referring to FIG. 6, when a remote system (a "client" 600) establishes a connection with the server 100, the client may wish to confirm that at least some of the third parties A, B, C have approved the server. The client may be a user of the server. The client may also be a peer server, for instance in the case where a set of servers operate as a cluster, and where for instance one server transmits user data 10 to another server.

In an embodiment, the client 600 has stored the public keys (certificates) 240 for the third parties. During remote attestation 140 of the server 100, the client obtains the PCR values for the server (both the sealing PCRs and the SA PCRs). Remote attestation 140 confirms to the client 600 that the server 100 has a valid TPM 120, and that the PCRs were generated properly. The client 600 also obtains the manifests 200 from the server. Using its own stored third party certificates 240, the client authenticates 320 the manifests, and then compares 330 the manifest PCR values with those provided by the server's remote attestation 140. If the manifests 200 are authenticated 320, and the PCR values match 330, then the client is assured that it is communicating with a legitimate approved server. Both the sealing PCRs and the SA PCRs may be compared. Once the client (user or peer server) legitimizes the server 100, it may transmit user data to the server.

In an embodiment, the client 600 obtains the third party manifests 200 during the remote attestation 140. This may be done securely by the server hashing 602 the manifests 200 with a challenge 610 that is issued by the client for the purpose of remote attestation (as specified by the Trusted Computing Group). The hash of the manifests and the challenge produces a new challenge 620, which the TPM 120 must sign (along with other values like the PCRs). The manifests, as well as the TPM's signature 630 of the new challenge and other values, are then transmitted back to the client. The client recreates the same new challenge by hashing the original challenge and the manifests signed by the TPM. If the recreated new challenge is properly signed (matches the new challenge 620), then the client knows that the manifests have been transmitted by the server itself.

Figure 7:
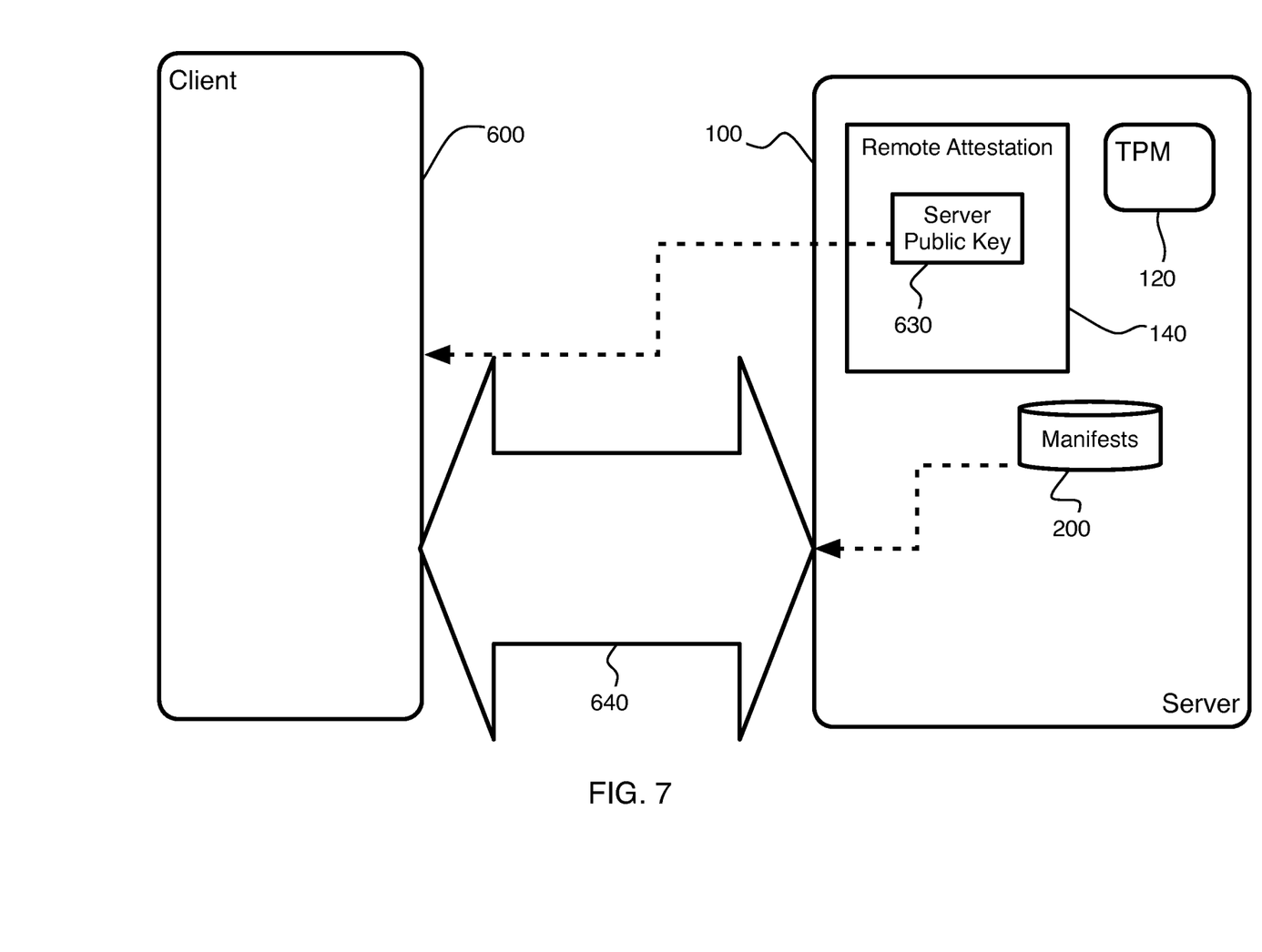
FIG. 7 shows in schematic view a mode of authenticating remote connection between a server and a client, according to another aspect of the invention.

In another embodiment, shown in FIG. 7, the client 600 uses a public key 630 (transmitted from the server during remote attestation 140) to establish with the server 100 a secure connection 640. This public key 630 may be authorized in the same way as were the manifests 200 in FIG. 6 (i.e., hashing the public key with the challenge signed by the TPM). The server 100 then transmits the manifests 200 to the client via the secure connection 640.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described method and system, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A server for sealing and unsealing user data, said server comprising:
    a processor; and
    a memory device, which stores: an encryption key, user data encrypted by the encryption key, a plurality of authenticated manifests each comprising authenticated measurements of the server, the authenticated measurements configured to be stored as hashes, and a server application comprising a manifest checker component and a sandbox component, the encryption key being sealed in the first memory device using a measurement of the manifest checker component;
    the processor being adapted by the server application to:
        implement the manifest checker component to obtain current measurements of the server corresponding to the authenticated measurements of the server, and to compare the current measurements to the authenticated measurements, wherein the measurements of the server do not include any measurement of the manifest checker component;
        implement the sandbox component to unseal the encryption key using a current measurement of the manifest checker component, and to access the user data using the encryption key, if the current measurements of the server sufficiently match the authenticated measurements of the server, or
        prevent implementation of the sandbox component, if the current measurements of the server do not sufficiently match the authenticated measurements of the server; and
    wherein at least two of the plurality of authenticated manifests have been authenticated by different certificates.

2. The server as claimed in claim 1, wherein the manifest checker component configures the processor to authenticate the authenticated manifests against a plurality of certificates stored in the memory device.

3. The server as claimed in claim 2, wherein the plurality of certificates are encoded into the server application.

4. The server as claimed in claim 3, wherein the manifest checker component incorporates the plurality of certificates.

5. The server as claimed in claim 2, wherein the manifest check component configures the processor such that the current measurements sufficiently match the authenticated measurements only if all of the authenticated manifests can be authenticated against the plurality of certificates stored in the memory device and only if all of the authenticated measurements match the current measurements.

6. The server as claimed in claim 2, wherein the manifest check component configures the processor such that the current measurements sufficiently match the authenticated measurements only if at least all but one of the authenticated manifests can be authenticated against the plurality of certificates stored in the memory device and only if at least all but one of the authenticated manifests contains authenticated measurements that match the current measurements.

7. The server as claimed in claim 2, wherein the manifest check component configures the processor such that the current measurements sufficiently match the authenticated measurements only if at least a majority of the authenticated manifests can be authenticated against the plurality of certificates stored in the memory device and only if at least a majority of the authenticated manifests contain authenticated measurements that match the current measurements.

8. The server as claimed in claim 2, wherein the manifest check component configures the processor such that the current measurements sufficiently match the authenticated measurements only if at least a majority of the authenticated manifests contain authenticated measurements that match the current measurements.

9. The server as claimed in claim 1, wherein the manifest check component configures the processor such that the current measurements cannot sufficiently match the authenticated measurements if at least one of the authenticated manifests comprises a disabled measurement that matches one of the current measurements.

10. The server as claimed in claim 1, wherein the manifest checker component includes a third party list that is not a part of the measurement of the manifest checker component, and the third party list comprises the certificates of third parties authorized to authenticate manifests.

11. The server as claimed in claim 10, wherein the manifest checker component also includes a certificate of an evaluating party who is authorized to modify the third party list, and the certificate of the evaluating party is a part of the measurement of the manifest checker component.

12. The server as claimed in claim 1, wherein the manifest checker component configures the processor to remotely attest another server by comparing current measurements of the other server to authenticated measurements of the manifests stored in the memory device.

13. The server as claimed in claim 1, wherein the manifest checker component configures the processor to check incoming user data for a data originator certificate, and to unseal data certified by the data originator only if a data originator manifest matches current measurements of the server application.

14. The server as claimed in claim 13, wherein the manifest checker component configures the processor to check the data originator certificate for a list of third parties that are approved to provide authenticated manifests.

15. The server as claimed in claim 14, wherein the manifest checker component configures the processor to check the data originator certificate in order to determine a standard for whether the current measurements of the server sufficiently match the authenticated measurements of the server.

16. A method for using a modifiable server to reliably seal and unseal data according to a measurement of said server, said method comprising:
    structuring the server to have a modifiable sandbox component for sealing and unsealing the data, and a non-modifiable checker component for enabling or disabling said sandbox component;

determining via the checker component whether the sandbox component complies with pre-determined standards; and enabling the sandbox component to seal and unseal the data using a measurement of the checker component, the measurement configured to be stored as one or more hashes, if the checker component has determined that the sandbox component complies with the pre-determined standards, or disabling the sandbox component, if the checker component has determined that the sandbox component does not comply with the pre-determined standards; and wherein the checker component determines whether the sandbox component complies with standards corresponding to a data originator certificate that accompanies incoming data, and the standards are set as authenticated measurements of the modifiable sandbox component, and the checker component obtains the authenticated measurements from one or more authenticated manifests identified by the data originator certificate.

17. The method as claimed in claim 16, wherein the checker component determines whether the sandbox component complies with pre-determined standards by comparing current measurements of the sandbox component to authenticated measurements contained in manifests certified by authorized third parties.

18. The method as claimed in claim 17, wherein the checker component authenticates each manifest against a plurality of certificates stored in the checker component.

19. The method as claimed in claim 18, wherein the measurement of the checker component, used for sealing and unsealing the data, does not include the plurality of certificates.

20. The method as claimed in claim 18, wherein the checker component accepts only those certificates that are included in a third party list that has been certified by an evaluating party.

21. The method as claimed in claim 17, wherein the checker component determines that the sandbox component complies with the pre-determined standards based on whether the current measurements sufficiently match the authenticated measurements, and a sufficient match is made only if all of the authenticated manifests can be authenticated against the plurality of certificates stored in the memory device and only if all of the authenticated measurements match the current measurements.

22. The method as claimed in claim 17, wherein the checker component determines that the sandbox component complies with the pre-determined standards based on whether the current measurements sufficiently match the authenticated measurements, and a sufficient match is made only if at least all but one of the authenticated manifests can be authenticated against the plurality of certificates stored in the memory device and only if at least all but one of the authenticated manifests contains authenticated measurements that match the current measurements.

23. The method as claimed in claim 17, wherein the checker component determines that the sandbox component complies with the pre-determined standards based on whether the current measurements sufficiently match the authenticated measurements, and a sufficient match is made only if at least a majority of the authenticated manifests can be authenticated against the plurality of certificates stored in the memory device and only if at least a majority of the authenticated manifests contain authenticated measurements that match the current measurements.

24. The method as claimed in claim 17, wherein the checker component determines that the sandbox component complies with the pre-determined standards based on whether the current measurements sufficiently match the authenticated measurements, and a sufficient match is made only if at least a majority of the authenticated manifests contain authenticated measurements that match the current measurements.

25. The method as claimed in claim 17, wherein the checker component determines that the sandbox component complies with the pre-determined standards based on whether the current measurements sufficiently match the authenticated measurements, and the current measurements cannot sufficiently match the authenticated measurements if at least one of the authenticated manifests comprises a disabled measurement that matches one of the current measurements.

* * * * *